F. A. E. G. de Massas.
Cotton Gin.
N° 52,116. Patented Jan. 16, 1866.
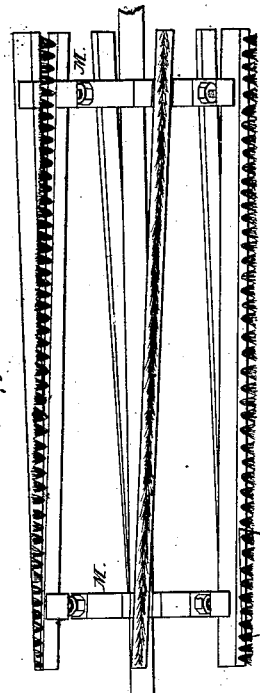
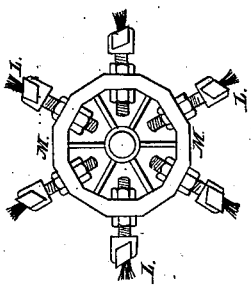
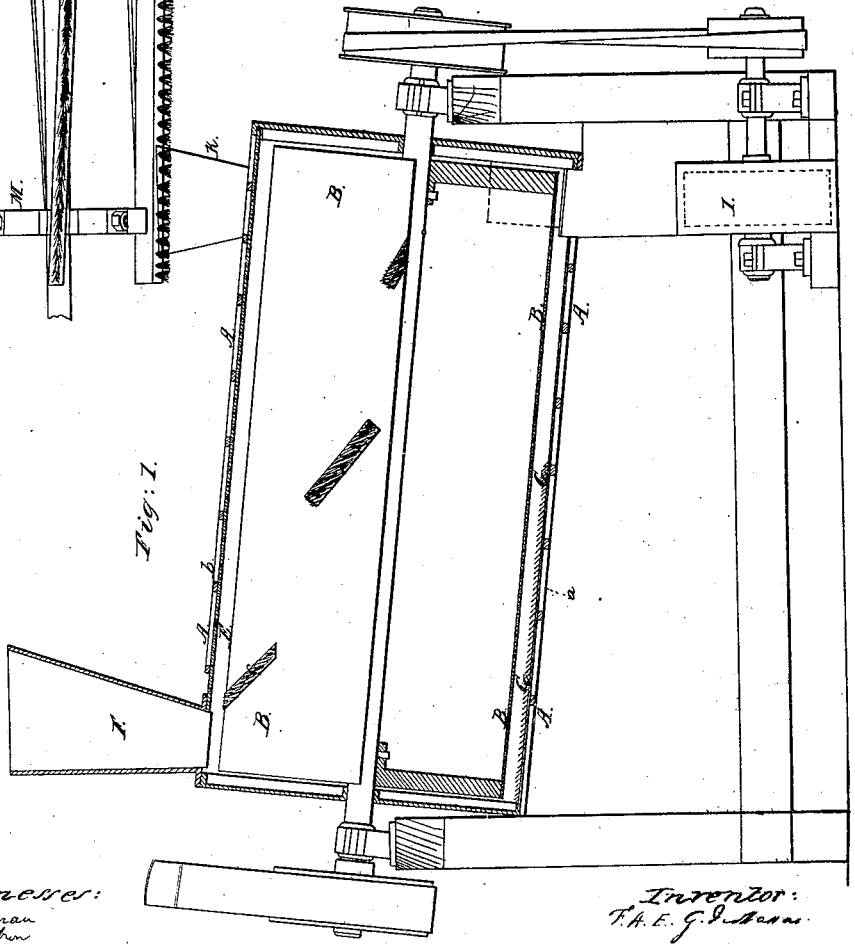

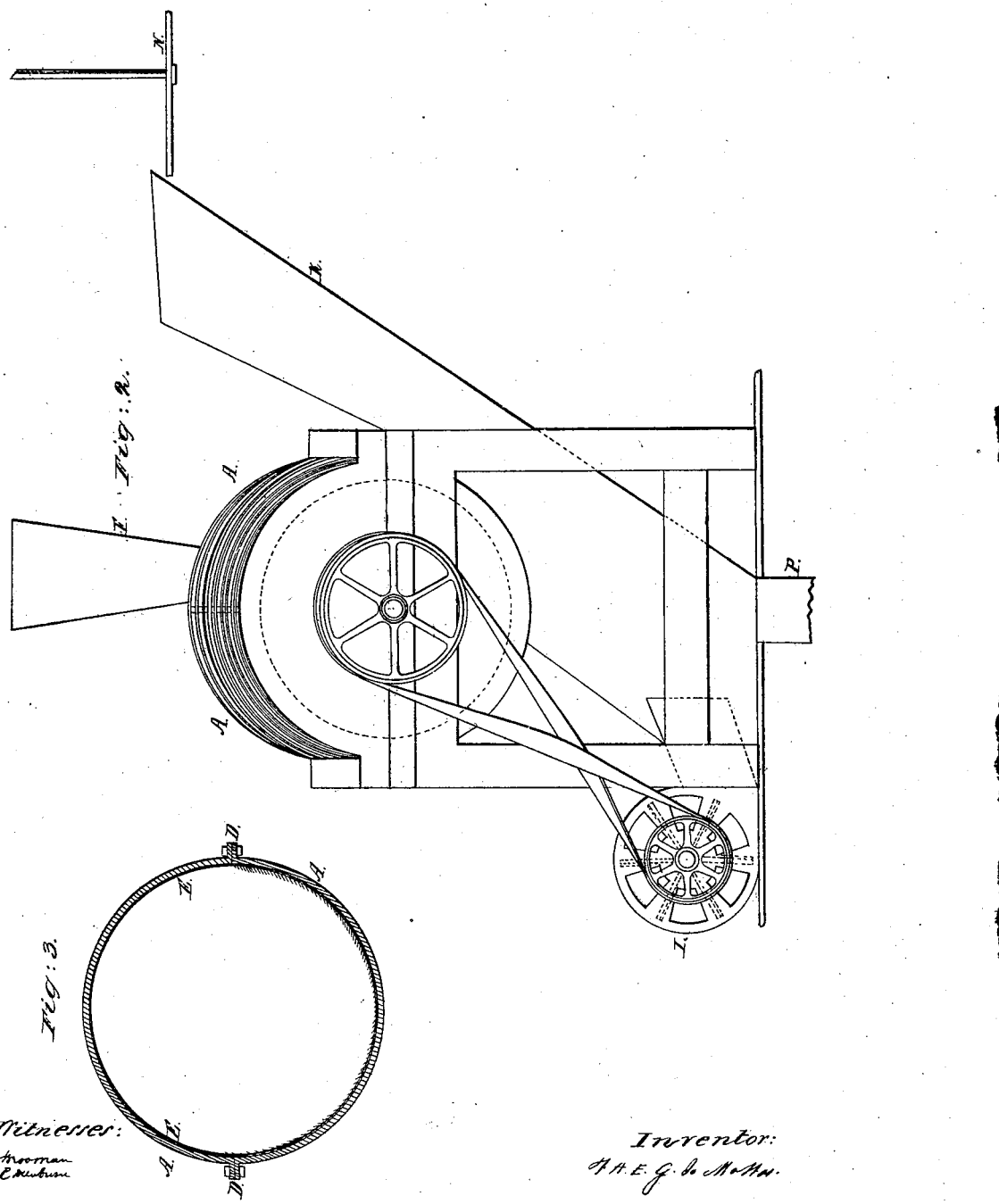

UNITED STATES PATENT OFFICE.

F. A. E. G. DE MASSAS, OF HOXTON, ENGLAND.

IMPROVEMENT IN COTTON-SEED MACHINES.

Specification forming part of Letters Patent No. 52,116, dated January 16, 1866.

*To all whom it may concern:*

Be it known that I, FRANCOIS ANTOINE EDMOND GUIRONNET DE MASSAS, of Hoxton, in the county of Middlesex, England, civil engineer, have invented Improvements in Machinery for Treating Cotton-Seeds; and I do hereby declare that the following is a full, clear, and exact description of the same, reference being had to the accompanying drawings, and to figures and letters marked thereon.

The object of my invention is the cleansing of cotton-seeds and the separation therefrom, in a state fit for use, of the cotton which adheres to them. This cleaning and this separation of the cotton are indispensable for the complete extraction of the oil and the purity of the cake made from the residuum.

For the purposes of my invention I construct and use a machine shown in the accompanying drawings, in which—

Figure 1 is a longitudinal section, and Fig. 2 an end view, of the machine.

B B is a cylinder revolving in a casing, A, of similar shape. The revolving cylinder is formed of perforated or roughened plates carrying spiral combs c c.

The cylinder A, forming the casing, and in which the cylinder B revolves, is formed of two parts divided longitudinally and fixed to the frame by means of bolts D D, as seen in Fig. 2, which is a section through the line a b of Fig. 1, or otherwise. The interior of this cylinder A is formed of perforated or punched iron E E, with the asperities on the inner side, and of coarse cards G G, which latter are, by preference, placed on the lower side or bottom of the casing. To the head and upper side of the cylinder A, I fit a hopper, F, through which the seed is fed into the machine. Another opening is made in this cylinder, at H, for the escape of the seeds into a chute descending to a lower level. I is a fan fixed near the lower end of the machine and communicating with a raised spout, K, fixed to the frame on the opposite side to the fan.

The seed enters the machine through the hopper F and is carried on by the revolving cylinder, which submits it alternately to the penetrating and tearing action of the cards and to the cutting action of the edges of the perforations of the plates. These actions, combined with the centrifugal force imparted by the rotation of the revolving cylinder, destroy the impurities mixed with the seeds and cut the cotton adhering to them. On reaching the lower end of the machine, assisted by the incline at which it is set and by the spiral arrangement of combs, the seeds fall and pass the mouth of the fan, the current from which drives the cotton up the raised spout K, the dust and small particles issue through the perforations in the casing A, and the seeds fall into a chute, P, below. When the seeds are too thickly enveloped with cotton the spiral combs do not drive the cotton on and out of the machine sufficiently quick. In such case I substitute for the revolving cylinder brushes L L, fixed spirally on a polygonal skeleton-drum, M, as shown in longitudinal elevation at Fig. 4 and in end view at Fig. 5, in such manner that their distance from the casing may be regulated. The drum, with the brushes, revolves in the casing. The brushes L are composed of vegetable fibers and wire mixed. The seeds are pressed between the brushes and the cards and perforated plates, and are subjected to this double and rough friction. The cotton torn or removed from the seeds enters the spaces between the spiral rows of brushes, and is thus conducted to the lower end of the machine, as also the seeds. On leaving the machine the seeds fall into the chute, while the cotton is blown up the raised chute by the current from the fan, and is collected upon a table, N, placed for its reception. The seeds pass in a channel with a double grating or sieve, whereby the purification of the seeds is effected.

I consider the revolving spiral brushes, composed of vegetable fibers, such as the roots of the rice-plant, couch-grass, and wire, to be equivalents of the revolving cylinder, when acting as described, to rub the seeds against the inner rough surface of the stationary cylinder. The velocity of the current of air must be such as will be strong enough to blow the cotton out of the spout, while at the same time it is not so strong as to support the seed. Any proper machine for creating a current of air may be employed in place of and as an equivalent for the fan.

I claim as of my invention—

1. A revolving cylinder with a rough surface, as described, in combination with a cylindrical casing, composed partly of cards and partly of perforated sheet-metal, as specified, the two acting in combination, substantially as set forth.

2. In combination with a revolving cylinder and a cylindrical casing, both substantially such as set forth, a fan and a spout, the whole combination acting substantially in the manner and for the purpose set forth.

F. A. E. G. DE MASSAS.

Witnesses:
R. A. BROOMAN,
I. C. MEWBURN,
*Both of* 166 *Fleet Street, London.*